United States Patent
Jeon et al.

(10) Patent No.: US 9,825,327 B2
(45) Date of Patent: Nov. 21, 2017

(54) NON-AQUEOUS ELECTROLYTE LITHIUM SECONDARY BATTERY

(75) Inventors: Jong-Ho Jeon, Daejeon (KR);
Jeong-Ju Cho, Daejeon (KR);
Ho-Chun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 929 days.

(21) Appl. No.: 12/673,361

(22) PCT Filed: Aug. 13, 2008

(86) PCT No.: PCT/KR2008/004689
§ 371 (c)(1),
(2), (4) Date: Nov. 5, 2010

(87) PCT Pub. No.: WO2009/022848
PCT Pub. Date: Feb. 19, 2009

(65) Prior Publication Data
US 2011/0111305 A1    May 12, 2011

(30) Foreign Application Priority Data

Aug. 16, 2007    (KR) .................. 10-2007-0082300

(51) Int. Cl.
*H01M 10/056* (2010.01)
*H01M 10/0525* (2010.01)
*H01M 10/0567* (2010.01)
H01M 4/587 (2010.01)
H01M 10/0569 (2010.01)
H01M 4/02 (2006.01)

(52) U.S. Cl.
CPC ... *H01M 10/0525* (2013.01); *H01M 10/0567* (2013.01); *H01M 4/587* (2013.01); *H01M 10/0569* (2013.01); *H01M 2004/021* (2013.01); *H01M 2300/0025* (2013.01); *H01M 2300/0037* (2013.01); *Y02T 10/7011* (2013.01)

(58) Field of Classification Search
CPC ......... H01M 10/0525; H01M 10/0567; H01M 10/0569; H01M 2004/021; H01M 2300/0025; H01M 2300/0037; H01M 4/587; Y02E 60/122; Y02T 10/7011
USPC ...................... 429/231.5, 326, 330, 331, 334
See application file for complete search history.

(56) References Cited

U.S. PATENT DOCUMENTS

| | | | | |
|---|---|---|---|---|
| 5,256,504 A | * | 10/1993 | Okuno et al. .................. | 429/332 |
| 5,284,722 A | * | 2/1994 | Sugeno .......................... | 429/332 |
| 6,399,255 B2 | * | 6/2002 | Herreyre et al. ............. | 429/331 |
| 7,083,878 B2 | | 8/2006 | Kotato et al. | |
| 2001/0019800 A1 | * | 9/2001 | Herreyre ............... | H01M 4/621 429/332 |
| 2002/0076605 A1 | | 6/2002 | Akashi et al. | |
| 2002/0164531 A1 | | 11/2002 | Sekino et al. | |
| 2003/0138703 A1 | | 7/2003 | Yamaguchi et al. | |
| 2003/0148190 A1 | | 8/2003 | Hamamoto et al. | |
| 2005/0084765 A1 | | 4/2005 | Lee et al. | |
| 2005/0191556 A1 | | 9/2005 | Kim et al. | |
| 2006/0121356 A1 | * | 6/2006 | Jan ..................... | H01M 10/0569 429/331 |
| 2006/0124973 A1 | | 6/2006 | Arai et al. | |
| 2007/0048607 A1 | * | 3/2007 | Nakashima ........... | H01M 2/166 429/209 |
| 2007/0092802 A1 | * | 4/2007 | Ahn et al. ..................... | 429/326 |
| 2008/0118841 A1 | * | 5/2008 | Kim et al. ............. | 429/231.95 |
| 2009/0047582 A1 | | 2/2009 | Kim et al. | |
| 2010/0015514 A1 | * | 1/2010 | Miyagi et al. ................ | 429/129 |

FOREIGN PATENT DOCUMENTS

| | | |
|---|---|---|
| CN | 1925206 A | 3/2007 |
| JP | 3-32338 U | 3/1991 |
| JP | 3-295178 A | 12/1991 |
| JP | 5-74489 A | 3/1993 |
| JP | 7-153486 A | 6/1995 |
| JP | 11-31527 A | 2/1999 |
| JP | 11-329494 A | 11/1999 |
| JP | 3-29271 B2 | 4/2000 |
| JP | 2001-126765 A | 5/2001 |
| JP | 2002-93464 A | 3/2002 |
| JP | 2003-272627 A | 9/2003 |
| JP | 2004-241339 A | 8/2004 |
| JP | 2004-319212 A | 11/2004 |
| JP | 2004-363086 A | 12/2004 |
| JP | 2005-72003 A | 3/2005 |
| JP | 2005-228513 A | 8/2005 |
| JP | 2005-267938 A | 9/2005 |
| JP | 2006-080008 A | 3/2006 |
| JP | 2007-128765 A | 5/2007 |
| JP | 2008-140760 A | 6/2008 |
| KR | 10-0441518 B1 | 7/2004 |
| KR | 10-2005-0071752 A | 7/2005 |
| KR | 10-2007-0019965 A | 2/2007 |
| KR | 10-0833041 B1 | 5/2008 |
| KR | 10-0873577 B1 | 12/2008 |

OTHER PUBLICATIONS

Partial English translation of JP-2007-128765-A dated May 24, 2007.

* cited by examiner

*Primary Examiner* — Milton I Cano
*Assistant Examiner* — Ling R Zeng
(74) *Attorney, Agent, or Firm* — Birch, Stewart, Kolasch & Birch, LLP

(57) ABSTRACT

A non-aqueous electrolyte includes (i) an inhibitor against a reaction between an anode and a linear ester; (ii) a mixed organic solvent containing cyclic carbonate and the linear ester; and (iii) an electrolyte salt, wherein the inhibitor is any one compound or a mixture of at least two compounds selected from the group consisting of cyclic carbonate with a vinyl group, fluorinated ethylene carbonate, vinylene carbonate, cyclic acid anhydride, a compound having a cyclic $S=O$ group and an acrylate-based compound. Also, an electrochemical device includes a cathode, an anode and the above non-aqueous electrolyte.

18 Claims, No Drawings

NON-AQUEOUS ELECTROLYTE LITHIUM SECONDARY BATTERY

TECHNICAL FIELD

The present invention relates to a non-aqueous electrolyte lithium secondary battery, and more particularly to a lithium secondary battery with an improved discharging characteristic at a high temperature.

BACKGROUND ART

Recently, interest in energy storage technologies has increased. As the energy storage technologies are extended to such devices as cellular phones, camcorders and notebook PCs, and further to electric vehicles, the demand for a high energy density battery used as a power source of such an electronic device is increased. A lithium ion secondary battery is one of the most satisfactory batteries, and numerous studies towards improvements are now in progress actively.

Among the currently used secondary batteries, a lithium secondary battery developed in the early 1990' includes an anode made of carbon material capable of occluding or emitting lithium ions, a cathode made of lithium-containing oxide, and a non-aqueous electrolyte obtained by dissolving a suitable amount of lithium salt in a mixed organic solvent.

The lithium secondary battery has an average discharge voltage of about 3.6V to about 3.7V, which exhibits advantageously higher operation voltage than those of other batteries such as alkali batteries or nickel-cadmium batteries. To create such a higher operation voltage, an electrolyte composition should be electrochemically stable in a charging/discharging voltage range from 0 to 4.2V. For this purpose, a mixed solvent in which a cyclic carbonate compound such as ethylene carbonate or propylene carbonate and a linear carbonate compound such as dimethyl carbonate, ethylmethyl carbonate or diethyl carbonate are suitably mixed is used as a solvent for the electrolyte. The solute of the electrolyte is usually a lithium salt, such as $LiPF_6$, $LiBF_4$ or $LiClO_4$, which acts as a source for supplying lithium ions in the battery and thus enables the lithium battery to operate.

Lithium ions coming out from the cathode active material such as lithium metal oxide during an initial charging process of a lithium secondary battery move towards the anode active material such as graphite and then are intercalated between the layers of the anode active material. At this time, due to the high reactivity of lithium, the electrolyte reacts with carbon of the anode active material on the surface of the anode active material such as graphite, thereby generating compounds such as $Li_2CO_3$, $Li_2O$ and $LiOH$. These compounds form a kind of SEI (Solid Electrolyte Interface) film on the surface of the anode active material such as graphite.

The SET film plays the role of an ion tunnel, which allows only lithium ions to pass. Due to the ion tunnel effects, the SET film prevents organic solvent having high molecular weight from moving together with lithium ions in the electrolyte and being intercalated into layers of the anode active material and thus breaking down the anode structure. Thus, since the electrolyte is not contacted with the anode active material, the electrolyte is not decomposed, and also the amount of lithium ions in the electrolyte is reversibly maintained, thereby ensuring stable charging/discharging.

However, in a thin angled battery, while the above SEI film is formed, gas such as $CO$, $CO_2$, $CH_4$ and $C_2H_6$, generated by decomposition of a carbonate-based solvent, increases the battery thickness during the charging process. In addition, if a battery is left at a high temperature in a fully charged state, the SEI film is slowly broken down due to increased electrochemical energy and thermal energy over time. As a result, side reactions continuously occur between the exposed surface of the anode and surrounding electrolyte. Due to continuous gas generation at this time, an inner pressure of the battery is increased, thereby increasing thickness of the battery, and this may cause problems in electronics such as cellular phones and notebook computers with regard to a high-temperature performance of the battery. In addition, the lithium secondary battery containing a large amount of ethylene carbonate exhibits a more serious problem in inner pressure increase of the battery since the SEI film is unstable. Further, since the ethylene carbonate has a high freezing point (37 to 39° C.) and it is in a solid state at room temperature, it has low ionic conductivity at a low temperature. Thus, a lithium battery using a non-aqueous solvent containing a large amount of ethylene carbonate exhibits poor low-temperature conductivity.

In order to solve the above problems, it has been suggested to use a method of adding a carbonate-based organic additive to the electrolyte so as to change the phase of the SEI film forming reaction. However, it is so far known in the art that, when the above specific compound is added to an electrolyte to improve the battery performance, some areas of performance are improved, but other areas of performance may deteriorate in many cases.

For example, Japanese Laid-open Patent Publication No. H07-153486 discloses a lithium secondary battery using an electrolyte made by adding 0.5 to 50 volume % of γ-butyrolactone to a 1:1 (volume ratio) mixture of ethylene carbonate and dimethyl carbonate. However, if γ-butyrolactone is added in this manner, the life cycle of the battery may be shortened though high-rate discharging characteristics at a low temperature are improved.

In addition, Japanese Patent No. 3,032,338 discloses a non-aqueous electrolyte secondary battery containing a ternary system organic solvent composed of an ethylene carbonate, dimethyl carbonate and methyl propionate. However, a linear carbonate such as dimethyl carbonate deteriorates charging/discharging cycle efficiencies of a lithium secondary battery, and methyl propionate deteriorates discharging characteristics since it has a relatively high reactivity with the anode.

In addition, Japanese Laid-open Patent Publication No. 1999-31527 discloses a non-aqueous electrolyte secondary battery containing a ternary system organic solvent composed of a cyclic carbonate, linear carbonate and ethyl propionate. However, this lithium secondary battery shows deteriorated charging/discharging cycle efficiencies due to the linear carbonate. In addition, ethyl propionate has low reactivity with the anode at a normal temperature to exhibit a good discharging characteristic. However, it exhibits a deteriorated discharging characteristic at a high temperature since it reacts with the anode. Accordingly, in the published document, the content of added ethyl propionate is controlled to be 5 volume % or less in order to minimize a self-discharging phenomenon at high temperature storage. Nevertheles, good low-temperature discharging characteristics are not ensured when ethyl propionate is added in a small amount as mentioned above.

Meanwhile, Japanese Patent No. 3,029,271 discloses a lithium secondary battery using a mixed organic solvent in which cyclic carbonate such as propylene carbonate and linear ester carbonate compound such as methyl acetate are mixed. However, methyl acetate also has relatively high reactivity with an anode, so a discharging characteristic decreases.

As mentioned above, it is urgent to develop a non-aqueous electrolyte composition capable of providing a lithium secondary battery that exhibits excellent high-rate charging/discharging characteristics, life cycle, low-temperature discharging characteristics and high-temperature discharging characteristics.

DISCLOSURE OF INVENTION

Technical Problem

The present invention is designed to solve the problems of the prior art, and therefore it is an object of the present invention to provide a lithium secondary battery, which exhibits excellent charging/discharging characteristics and improved life cycle and low-temperature discharging characteristics, and also restrains a reaction between an anode and an organic solvent such that high-temperature discharging characteristics are particularly improved.

Technical Solution

In order to accomplish the above object, the present invention provides a lithium secondary battery having an anode made of carbon material capable of occluding or emitting a lithium ion, a cathode made of lithium-containing oxide, and a non-aqueous electrolyte, wherein the non-aqueous electrolyte includes a lithium salt; a non-linear carbonate-based mixed organic solvent in which (a) cyclic carbonate having ethylene carbonate or a mixture of ethylene carbonate and propylene carbonate and (b) ethyl propionate are mixed at a volume ratio (a:b) in the range from 10:90 to 70:30; and an inhibitor against a reaction between the anode and the ethyl propionate.

In the lithium secondary battery according to the present invention, the inhibitor against reaction between ethyl propionate and the anode preferably is any one compound or a mixture of at least two compounds selected from the group consisting of cyclic carbonate with a vinyl group, fluorinated ethylene carbonate, vinylene carbonate, cyclic acid anhydride, a compound having a cyclic S=O group, and an acrylate-based compound. The content of the added inhibitor against a reaction between the anode and the ethyl propionate may be about 1 to about 10 weight % based on the total weight of the non-aqueous electrolyte.

BEST MODE FOR CARRYING OUT THE INVENTION

Hereinafter, preferred embodiments of the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

As explained above, a lithium secondary battery includes an anode made of carbon material capable of occluding or emitting a lithium ion, a cathode made of lithium-containing oxide, and a non-aqueous electrolyte.

The non-aqueous electrolyte includes a lithium salt; a non-linear carbonate-based mixed organic solvent in which (a) cyclic carbonate constituting ethylene carbonate or a mixture of ethylene carbonate and propylene carbonate and (b) a linear ester such as ethyl propionate are mixed at a volume ratio (a:b) in the range from about 10:90 to about 70:30; and an inhibitor against reaction between the anode and the ethyl propionate.

Ethylene carbonate or a mixture of ethylene carbonate and propylene carbonate has a high dielectric constant and thus easily dissociates a lithium salt in an electrolyte, which improves the charging/discharging capacity of a battery. In case propylene carbonate is mixed, a preferable volume ratio of propylene carbonate is about ¼ to about 1 with respect to ethylene carbonate. The non-aqueous electrolyte of the lithium secondary battery according to the present invention employs a non-linear carbonate-based organic solvent. Linear carbonate is not added so as to improve charging/discharging cycle efficiencies of the lithium secondary battery, but a small amount of linear carbonate may be included if it does not cause any negative influence towards the objectives of the present invention.

As a linear ester, a propionate-based ester such as ethyl propionate is used since it has a low freezing point and a high boiling point and exhibits excellent low-temperature characteristics. In particular, ethyl propionate exhibits relatively low reactivity with an anode. The ethyl propionate is mixed with the above-mentioned cyclic carbonate to impart improvement of low-temperature discharging characteristics and life cycle to the lithium secondary battery. A volume ratio (a:b) of (a) cyclic carbonate having ethylene carbonate or a mixture of ethylene carbonate and propylene carbonate and (b) ethyl propionate is preferably in the range from about 10:90 to about 70:30, more preferably from about 20:80 to about 60:40.

The linear ester used in the present invention may be expressed by the following Chemical Formula 1:

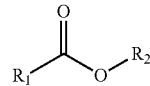

Chemical Formula 1 where $R_1$ and $R_2$ are independently a linear or branched $C_{1-6}$ alkyl group, and $R_1$ and $R_2$ may be unsubstituted or substituted with at least one halogen, respectively. $R_1$ is preferably a $CH_3CH_2$ group.

Non-limiting examples of the propionate-based ester compound expressed by the Chemical Formula 1 include at least one compound selected from the group consisting of methyl propionate, ethyl propionate, propyl propionate, and butyl propionate.

If the volume ratio of ethyl propionate is less than the above range, low-temperature discharging characteristics of a lithium secondary battery deteriorate. If the volume ratio of ethyl propionate exceeds the above range, high-rate charging/discharging characteristics of a lithium secondary battery decrease.

In addition, the non-aqueous electrolyte of a lithium secondary battery according to the present invention includes an inhibitor against a reaction between the anode and the ethyl propionate.

As mentioned above, ethyl propionate has low reactivity with an anode at a normal temperature and thus exhibits excellent discharging characteristics, but ethyl propionate shows deteriorated discharging characteristics at a high temperature since it reacts with an anode. Thus, in order to prevent the high-temperature discharging characteristics from being deteriorated due to self-discharging phenomenon at high temperature storage, the inhibitor against a reaction between the anode and the ethyl propionate is added in the present invention.

Such an inhibitor is decomposed prior to the cyclic carbonate and the ethyl propionate and forms a film on an anode, when a lithium secondary battery is initially charged. Accordingly, it is possible to prevent ethyl propionate from reacting with an anode and thus deteriorating the discharging cycle efficiencies even at a high temperature.

The inhibitor against reaction between the ethyl propionate and the anode may include preferably any one compound or a mixture of at least two compounds selected from the group consisting of cyclic carbonate with a vinyl group, fluorinated ethylene carbonate, vinylene carbonate, cyclic acid anhydride, a compound having a cyclic S=O group, and an acrylate-based compound.

The cyclic carbonate having a vinyl group may include any one compound or a mixture of at least two compounds selected from the group consisting of 4-vinyl-1,3-dioxolane-2-one, 4-vinyl-4-methyl-1,3-dioxolane-2-one, 4-vinyl-4-ethyl-1,3-dioxolane-2-one, 4-vinyl-4-n-propyl-1,3-dioxolane-2-one, 4-vinyl-5-methyl-1,3-dioxolane-2-one, 4-vinyl-5-ethyl-1,3-dioxolane-2-one, 4-vinyl-5-n-propyl-1,3-dioxolane-2-one, and 1,3-dioxolane-2-onylmethyl allyl sulfonate, but it is not limited thereto.

The cyclic acid anhydride may include any one compound or a mixture of at least two compounds selected from the group consisting of succinic anhydride, maleic anhydride, itaconic anhydride, citraconic anhydride and phthalic anhydride, but it is not limited thereto.

The compound having a cyclic S=O group may include cyclic sulfite, saturated sultone, unsaturated sultone, and non-cyclic sulfone, for example. Non-limiting examples of the cyclic sulfite may be ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, and 1,3-butylene glycol sulfite. Also, the saturated sultone may include 1,3-propane sultone and 1,4-butane sultone, but it is not limited thereto. In addition, the unsaturated sultone may include ethene sultone, 1,3-propene sultone, 1,4-butene sultone, and 1-methyl-1,3-propene sultone, but not limitedly. Also, the non-cyclic sulfone may include divinyl sulfone, dimethyl sulfone, diethyl sulfone, methyl ethyl sulfone, and methyl vinyl sulfone, but it is not limited thereto. The above compounds may be used alone or in combination.

Non-limiting examples of the acrylate-based compound may include trimethyllolpropane triacrylate, ditrimethylolpropane tetraacrylate, dipentaerythritol hexaacrylate, and tris[2-(acryloyloxy)ethyl] isocyanurate.

The inhibitor against reaction between the anode and the ethyl propionate may be added at a content of about 1 to about 10 weight % based on the total weight of the non-aqueous electrolyte.

In the non-aqueous electrolyte of a lithium secondary battery according to the present invention, the lithium salt included therein as an electrolyte may employs any one commonly used in an electrolyte for a lithium secondary battery, and the representative examples of lithium salt may include $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$ and $LiC(CF_3SO_2)_3$. In addition, other compounds such as lactone, ether, ester, acetonitrile, lactam, and ketone may be added to the non-aqueous electrolyte of a lithium secondary battery without departing from the purpose of the present invention.

The anode made of a carbon material capable of occluding or emitting a lithium ion and the cathode made of lithium-containing oxide, used for the lithium secondary battery of the present invention, may be any one commonly used for making a lithium secondary battery.

For example, the carbon material capable of occluding or emitting a lithium ion may be any one of low-crystalline carbon, high-crystalline carbon, and like. The low-crystalline carbon includes soft carbon or hard carbon, and the high-crystalline carbon includes natural graphite, Kish graphite, pyrolytic carbon, mesophase pitch based carbon fiber, meso-carbon microbeads, mesophase pitches, and high-temperature sintered carbon such as petroleum or coal tar pitch derived cokes, but it is not limited thereto. At this time, the anode may have a binding agent, which may use various kinds of binding agent polymer such as PVDF-co-HFP (polyvinylidene-co-hexafluoropropylene), polyvinylidenefluoride, acryl binding agents polyacrylonitrile and polymethylmethacrylate, SBR (styrene-butadiene rubber) copolymer, and modified styrene-butadiene copolymer.

The kind of the binding agent used in the present invention may vary depending on the specific surface area size of the anode. In particular, organic-based binding agent such as polyvinylidenefluorides (PVDFs) may be employed for the anode having a small specific surface area of less than about 1.5 $m^2/g$, especially from about 0.5 $m^2/g$ to about 1.5 $m^2/g$. On the other hand, water-based binding agents such as Styrene Butadiene Rubbers (SBRs) may be employed for the anode having a large specific surface area of more than about 1.5 $m^2/g$, especially from about 1.5 $m^2/g$ to about 4.5 $m^2/g$. It is a fact that the larger the specific surface area of the anode, the more the linear ester compound reacts with the anode active material. As a result, use of a PVDF-based binding agent may lead to acceptable side reductive reactions between the anode and the linear ester compound. However, an SBR-based binding agent promotes excessive reductive reactions between the two. The side reactions proceed more rapidly at a high temperature, resulting in a decline of the battery performance. Therefore, the secondary battery fabricated by using the water-based binding agent requires an anode inhibitor to prevent the side reactions. Water-based SBR is more preferable.

In addition, a cathode active material made of lithium-containing oxide preferably employs a lithium-containing transition metal oxide, for example any one compound or a mixture of at least two compounds selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0 \leq y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<z<2$), $LiCoPO_4$ and $LiFePO_4$, but it is not limited thereto.

In addition, a separator is generally interposed between the cathode and the anode, and the separator may be common porous polymer films used as a conventional separator, such as porous polymer film made using ethylene homopolymer, propylene homopolymer, ethylene/butene copolymer, ethylene/hexene copolymer or ethylene/methacrylate copolymer, in a single layer or in laminate form. In other cases, the separator may be a common porous non-woven fabric such as a non-woven fabric made of glass fiber with a high melt point or polyethylene terephthalate fiber, but it is not limited thereto.

There is no particular limitation regarding the type of shape of the lithium secondary battery which may be in a cylindrical can shape, an angled shape, a pouch shape or a coin shape.

MODE FOR THE INVENTION

Hereinafter, the present invention is explained in more detail using embodiments. However, the following Embodiments and Comparative Examples may be modified in various ways, and the present invention should not be interpreted as being limited thereto. The following Embodiments are just given for persons having ordinary skill in the art to understand the present invention in a better way.

Embodiment 1

$LiPF_6$ was added to a mixed organic solvent in which ethylene carbonate (EC) and ethyl propionate (EP) are mixed in a volume ratio of 3:7 to make 1M $LiPF_6$ solution, and then 4-vinyl-1,3-dioxolane-2-one (VEC), a kind of cyclic carbonate having a vinyl group, was added as an anode decomposition inhibitor thereto at a content of 2 weight % based on the total weight of a non-aqueous electrolyte, thereby making a non-aqueous electrolyte.

Embodiment 2

A non-aqueous electrolyte was made in the same way as in the Embodiment 1, except that 1,3-dioxolane-2-onylmethyl allyl sulfonate (VSEC) expressed by the following chemical formula was added instead of VEC.

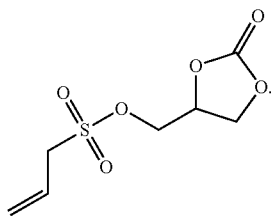

Embodiment 3

A non-aqueous electrolyte was made in the same way as in the Embodiment 1, except that 3-fluoroethylene carbonate (FEC), a kind of fluorinated ethylene carbonate, was added instead of VEC.

Embodiment 4

A non-aqueous electrolyte was made in the same way as in the Embodiment 1, except that vinylene carbonate (VC) was added instead of VEC.

Embodiment 5

A non-aqueous electrolyte was made in the same way as in the Embodiment 1, except that 1 weight % of succinic anhydride (SA), a kind of cyclic acid anhydride, was added instead of VEC.

Embodiment 6

A non-aqueous electrolyte was made in the same way as in the Embodiment 1, except that ethylene sulfite (ES), a kind of cyclic sulfite, was added instead of VEC.

Embodiment 7

A non-aqueous electrolyte was made in the same way as in the Embodiment 1, except that 1,3-propane sultone (PS), a kind of saturated sultone, was added instead of VEC.

Embodiment 8

A non-aqueous electrolyte was made in the same way as in the Embodiment 1, except that 1,3-propene sultone (PRS), a kind of unsaturated sultone, was added instead of VEC.

Embodiment 9

A non-aqueous electrolyte was made in the same way as in the Embodiment 1, except that 1 weight % of dipentaerythritol hexaacrylate (DPEHA), a kind of acrylate-based compound, was added instead of VEC.

Embodiment 10

A non-aqueous electrolyte was made in the same way as in the Embodiment 1, except that a ratio of EP is increased such that a mixture ratio of EC:EP becomes 2:8.

Embodiment 11

A non-aqueous electrolyte was made in the same way as in the Embodiment 1, except that a ratio of EP is decreased such that a mixture ratio of EC:EP becomes 6:4.

Embodiment 12

A non-aqueous electrolyte was made in the same way as in the Embodiment 1, except that the solvent composition is changed into EC:PC:EP=2:1:7 so as to include propylene carbonate (PC).

Comparative Example 1

A non-aqueous electrolyte was made in the same way as in the Embodiment 1, except that VEC is not added.

Comparative Example 2

A non-aqueous electrolyte was made in the same way as in the Embodiment 1, except that a ratio of EP is decreased such that a mixture ratio of EC:EP becomes 8:2.

Comparative Example 3

A non-aqueous electrolyte was made in the same way as in the Embodiment 1, except that the solvent composition is changed into EC:DMC:EP=3:4:3 so as to include dimethyl carbonate (DMC).

Experimental Example 1

Comparison of Anode SEI Formation by Inhibitor Additives. Anode Initial Efficiency and Thermal Stability of Anode SEI Coin-type half batteries were manufactured in a common way using artificial graphite as a cathode, $LiCoO_2$ as a cathode active material and lithium foil as an anode active material, also using the non-aqueous electrolytes prepared by the Embodiments 1 to 12 and the Comparative Examples 1 to 3, and SBR as a binding agent.

The coin batteries were respectively charged/discharged three times at a normal temperature of 23° C. at a 0.1C current rate. Charging/discharging efficiency at first and third cycles are listed in the following Table 1. From the Table 1, the coin batteries containing an anode decomposition inhibitor according to the Embodiments 1 to 12 and the Comparative Examples 2 and 3 show slightly lower charging/discharging efficiency on the first time, but higher efficiency on the third time, than the coin battery without an anode decomposition inhibitor according to the Comparative Example 1. This is because each additive forms a SEI film on the anode surface at the first charging/discharging, which restrains side reactions such as electrolyte decomposition in the anode during the following cycles.

The following Experiment was conducted in order to check whether a SEI film was formed on an anode by each additive. The coin half battery, charged/discharged five times, was dissembled in a discharged state, and then an anode was taken out from the battery. Then, DSC (differential scanning calorimetry) analysis was carried out on the removed anode. The Table 1 shows an exothermic onset temperature of the anode. For reference, the exothermic reaction observed between 100 to 140° C. is caused by thermal collapse of the SET film on the anode surface. As seen from the Table 1, it would be understood that exothermic reaction of an anode shows different phases depending on the kind of electrolyte additives. From the above experiments, it was specifically verified that the inhibitor against reaction between the anode and the ethyl propionate added to the non-aqueous electrolyte in the Embodiments associates with forming of an anode SEI film layer.

Experimental Example 2

Comparison of Battery Life Cycle, High-Rate and Low-Temperature Discharging Characteristics, and High-Temperature Preservation Characteristics Pouch-type lithium secondary batteries were manufactured in a common way using the electrolytes prepared in the embodiments 1 to 12 and the Comparative Examples 1 to 3, using $LiCoO_2$ as a cathode active material and artificial graphite as an anode active material, and SBR as a binding agent. After the electrolytes were respectively injected into the manufactured pouch-type batteries, the batteries were aged for 2 days at a normal temperature, and then charged for 50 minutes at a 0.2C-rate. Subsequently, the batteries were degassed and resealed, charged to 4.2V at a 0.2C-rate under a constant current/constant voltage condition, and then discharged to 3.0V at a 0.2C-rate under a constant current condition, which is called an initial charging/discharging.

Life Cycle

After the batteries manufactured as above were initially charged/discharged, the batteries were charged/discharged 300 times at a 1.0C-rate in the same voltage region. A sustainable yield of capacity at 300 times to the initial discharge capacity is listed in the following Table 2.

High-Rate Discharging Characteristic

After the batteries manufactured as above were initially charged/discharged, the batteries were charged/discharged 4 times at a 1.0C-rate, charged at a 1.0C-rate, and then discharged at a 0.2C-rate in the same voltage region. At this time, a fourth discharge capacity at a 1.0C-rate and a discharge capacity at a 0.2C rate are listed in the following Table 2.

Low-Temperature Discharging Characteristic

After the batteries manufactured as above were initially charged/discharged, the batteries were charged at a 1.0C-rate and discharged at a 0.2C-rate at a normal temperature in the same voltage region. Subsequently, The batteries charged at a 1.0C-rate were put into a low-temperature chamber of −20° C., and then discharged at a 0.2C-rate. At this time, a ratio of discharge capacities at a normal temperature and −20° C., respectively is shown in the following Table 2.

TABLE 1

| | Solvent composition | Additive | First charging/ discharging efficiency (%) | Third charging/ discharging efficiency (%) | DSC exothermic onset temperature (° C.) |
|---|---|---|---|---|---|
| Embodiment 1 | EC/EP (3:7) | VEC 2% | 90.4 | 99.4 | 124 |
| Embodiment 2 | EC/EP (3:7) | VSEC 2% | 90.9 | 99.3 | 122 |
| Embodiment 3 | EC/EP (3:7) | FEC 2% | 91.2 | 98.9 | 85 |
| Embodiment 4 | EC/EP (3:7) | VC 2% | 89.8 | 99.4 | 123 |
| Embodiment 5 | EC/EP (3:7) | SA 1% | 89.1 | 98.4 | 117 |
| Embodiment 6 | EC/EP (3:7) | ES 2% | 90.2 | 99.2 | 127 |
| Embodiment 7 | EC/EP (3:7) | PS 2% | 90.7 | 99.1 | 126 |
| Embodiment 8 | EC/EP (3:7) | PRS 2% | 89.3 | 98.6 | 128 |
| Embodiment 9 | EC/EP (3:7) | DPEHA 1% | 91.6 | 99.5 | 118 |
| Embodiment 10 | EC/EP (2:8) | VEC 2% | 89.5 | 99.3 | 124 |
| Embodiment 11 | EC/EP (6:4) | VEC 2% | 90.5 | 99.2 | 125 |
| Embodiment 12 | EC/PC/EP (2:1:7) | VEC 2% | 88.9 | 99.3 | 124 |
| Comparative Example 1 | EC/EP (3:7) | None | 92.2 | 97.7 | 111 |
| Comparative Example 2 | EC/EP (8:2) | VEC 2% | 89.5 | 98.6 | 121 |
| Comparative Example 3 | EC/DMC/EP (3:4:3) | VEC 2% | 91.1 | 98.4 | 123 |

High-Temperature Preservation Characteristic

After the batteries manufactured as above were initially charged/discharged, the batteries were initially charged to 4.2V, respectively, and then preserved at 80° C. for 24 hours. After that, the change of OCV (open circuit voltage) of the batteries was measured. The reduction of OCV is shown in the Table 2.

As seen from the results in the Table 2, the battery of the Comparative Example 1, to which an inhibitor against reaction between the anode and the ethyl propionate is not added, exhibits deteriorated life cycle and high-temperature preservation characteristics. In addition, the batteries of the Comparative Examples 2 and 3, to which an inhibitor against reaction between the anode and the ethyl propionate is added but the content of EP is low with the solvent composition of EC:EP=8:2 or EC:DMC:EP=3:4:3, exhibit decreased OCV reduction at high-temperature preservation rather than the Comparative Example 1, but they do not show even any improvement in life cycle and high-rate and low-temperature discharging characteristics. Meanwhile, it is understood that the batteries according to the Embodiments 1 to 12 of the present invention, in which the content of EP is over a certain ratio and to which the anode decomposition inhibitor is added, exhibit excellent characteristics in all evaluation items.

TABLE 2

| | Solvent composition/ additive | Sustainable yield of capacity at 300 times to initial capacity (%) | High-rate discharging capacity ratio (%) | Low- temperature discharging capacity ratio (%) | OCV reduction at high- temperature preservation (mV) |
|---|---|---|---|---|---|
| Embodiment 1 | EC/EP (3:7)VEC 2% | 82.7 | 91.2 | 90.7 | 34 |
| Embodiment 2 | EC/EP (3:7)VSEC 2% | 80.3 | 88.2 | 92.6 | 31 |
| Embodiment 3 | EC/EP (3:7)FEC 2% | 81.2 | 93.8 | 93.1 | 42 |
| Embodiment 4 | EC/EP (3:7)VC 2% | 87.5 | 90.6 | 92.1 | 29 |
| Embodiment 5 | EC/EP (3:7)SA 1% | 78.0 | 87.0 | 86.2 | 33 |
| Embodiment 6 | EC/EP (3:7)ES 2% | 79.1 | 89.3 | 88.5 | 31 |
| Embodiment 7 | EC/EP (3:7)PS 2% | 82.2 | 90.6 | 89.0 | 37 |
| Embodiment 8 | EC/EP (3:7)PRS 2% | 80.8 | 88.3 | 83.3 | 40 |
| Embodiment 9 | EC/EP (3:7)DPEHA 1% | 83.7 | 91.3 | 85.7 | 42 |
| Embodiment 10 | EC/EP (2:8)VEC 2% | 78.4 | 90.2 | 94.4 | 55 |
| Embodiment 11 | EC/EP (6:4)VEC 2% | 80.6 | 84.3 | 78.2 | 38 |
| Embodiment 12 | EC/PC/EP (2:1:7)VEC 2% | 83.1 | 87.8 | 91.0 | 33 |
| Comparative example 1 | EC/EP (3:7)None | 16.6 | 82.4 | 91.9 | 154 |
| Comparative example 2 | EC/EP (8:2)VEC 2% | 55.2 | 47.3 | 38.2 | 78 |
| Comparative example 3 | EC/DMC/EP (3:4:3)VEC 2% | 83.2 | 92.0 | 43.1 | 45 |

INDUSTRIAL APPLICABILITY

The lithium secondary battery of the present invention includes a predetermined mixed organic solvent not having a linear carbonate, so as to ensure excellent high-rate charging/discharging characteristics and improved life cycle and low-temperature discharging characteristics. Also, the lithium secondary battery of the present invention improves discharging characteristics particularly at a high temperature by restraining a reaction between the anode and the organic solvent.

The invention claimed is:

1. A lithium secondary battery comprising:
an anode, a cathode, a separator between the anode and the cathode, a binding agent comprising a water-based binder for the anode, and a non-aqueous electrolyte, wherein the anode has a specific surface area of at least about 1.5 m²/g, and
wherein the non-aqueous electrolyte comprises a lithium salt; a non-linear carbonate-based mixed organic solvent consisting of (a) a cyclic carbonate comprising ethylene carbonate and (b) a propionate-based ester having the following chemical formula are mixed at a volume ratio (a:b) in the range from about 20:80 to about 60:40; and an inhibitor against a reaction between the anode and the propionate-based ester:

Chemical Formula 1

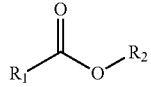

where $R_1$ is a $CH_3CH_2$ group and $R_2$ is ethyl,
wherein the inhibitor is one or more selected from the group consisting of cyclic carbonate with a vinyl group, fluorinated ethylene carbonate and a compound having a cyclic S=O group, and
a linear carbonate is excluded from the lithium secondary battery.

2. The lithium secondary battery according to claim 1, wherein the content of the inhibitor against the reaction between the anode and the propionate-based ester is 1 to 10 weight % based on the total weight of the non-aqueous electrolyte.

3. The lithium secondary battery according to claim 1, wherein the lithium salt is any one compound or a mixture of at least two compounds selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$ and $LiC(CF_3SO_2)_3$.

4. The lithium secondary battery according to claim 1, wherein the anode is made of carbon material capable of occluding or emitting a lithium ion.

5. The lithium secondary battery according to claim 1, wherein the cathode is made of lithium-containing oxide.

6. The lithium secondary battery according to claim 1, wherein the water-based binder for the anode having the specific surface area range from about 1.5 m²/g to about 4.5 m²/g.

7. The lithium secondary battery according to claim 1, wherein the water-based binder includes a styrene-butadiene rubber (SBR).

8. A lithium secondary battery comprising:
an anode, a cathode, a separator between the anode and the cathode, a binding agent comprising a water-based binder for the anode, and a non-aqueous electrolyte,
wherein the anode has a specific surface area of at least about 1.5 m$^2$/g, and
wherein the non-aqueous electrolyte comprises a lithium salt; a non-linear carbonate-based mixed organic solvent consisting of (a) a cyclic carbonate comprising ethylene carbonate and (b) a propionate-based ester having the following chemical formula are mixed at a volume ratio (a:b) in the range from about 20:80 to about 60:40; and an inhibitor against a reaction between the anode and the propionate-based ester:

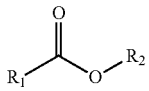

Chemical Formula 1 where R$_1$ is a CH$_3$CH$_2$ group and R$_2$ is ethyl, and
wherein the inhibitor is one or more selected from the group consisting of cyclic carbonate with a vinyl group, fluorinated ethylene carbonate and a compound having a cyclic S=O group.

9. The lithium secondary battery according to claim 1, wherein the inhibitor comprises a cyclic carbonate with a vinyl group.

10. The lithium secondary battery according to claim 9, wherein the cyclic carbonate with a vinyl group is one or more selected from the group consisting of 4-vinyl-4-methyl-1,3-dioxolane-2-one, 4-vinyl-4-ethyl-1,3-dioxolane-2-one, 4-vinyl-4-n-propyl-1,3-dioxolane-2-one, 4-vinyl-5-methyl-1,3-dioxolane-2-one, 4-vinyl-5-ethyl-1,3-dioxolane-2-one, and 4-vinyl-5-n-propyl-1,3-dioxolane-2-one.

11. The lithium secondary battery according to claim 1, wherein the inhibitor comprises a fluorinated ethylene carbonate.

12. The lithium secondary battery according to claim 1, wherein the inhibitor comprises a compound having a cyclic S=O group.

13. The lithium secondary battery according to claim 12, wherein the compound having a cyclic S=O group is one or more selected from the group consisting of ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, and 1,3-butylene glycol sulfite, 1,4-butane sultone, ethene sultone, 1,4-butene sultone, and 1-methyl-1,3-propene sultone, dimethyl sulfone, diethyl sulfone, methyl ethyl sulfone, and methyl vinyl sulfone.

14. The lithium secondary battery according to claim 8, wherein the inhibitor comprises a cyclic carbonate with a vinyl group.

15. The lithium secondary battery according to claim 14, wherein the cyclic carbonate with a vinyl group is one or more selected from the group consisting of 4-vinyl-4-methyl-1,3-dioxolane-2-one, 4-vinyl-4-ethyl-1,3-dioxolane-2-one, 4-vinyl-4-n-propyl-1,3-dioxolane-2-one, 4-vinyl-5-methyl-1,3-dioxolane-2-one, 4-vinyl-5-ethyl-1,3-dioxolane-2-one, and 4-vinyl-5-n-propyl-1,3-dioxolane-2-one.

16. The lithium secondary battery according to claim 8, wherein the inhibitor comprises a fluorinated ethylene carbonate.

17. The lithium secondary battery according to claim 8, wherein the inhibitor comprises a compound having a cyclic S=O group.

18. The lithium secondary battery according to claim 17, wherein the compound having a cyclic S=O group is one or more selected from the group consisting of ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, and 1,3-butylene glycol sulfite, 1,4-butane sultone, ethene sultone, 1,4-butene sultone, and 1-methyl-1,3-propene sultone, dimethyl sulfone, diethyl sulfone, methyl ethyl sulfone, and methyl vinyl sulfone.

* * * * *